United States Patent [19]

Killian

[11] 4,023,432
[45] May 17, 1977

[54] ACTUATOR HAVING UNIVERSAL-TYPE JOINT ASSEMBLY

[75] Inventor: Henry R. Killian, Sugarland, Tex.

[73] Assignee: Keystone International, Inc., Houston, Tex.

[22] Filed: Dec. 15, 1975

[21] Appl. No.: 640,440

[52] U.S. Cl. .............................. 74/424.8 VA; 64/7; 64/8; 74/424.8 R; 251/274

[51] Int. Cl.[2] ...................... F16H 1/18; F16D 3/02; F16D 3/16; F16K 31/44

[58] Field of Search ............ 74/424.8 VA, 424.8 R, 74/89.15, 509, 841; 251/264, 274; 64/7, 8

[56] References Cited

UNITED STATES PATENTS

| 2,460,648 | 2/1949 | Millar | 64/7 |
|---|---|---|---|
| 2,908,182 | 10/1959 | Bacchi | 74/509 |
| 2,909,079 | 10/1959 | Fawkes | 74/509 |
| 2,930,252 | 3/1960 | Sears et al. | 74/509 |
| 3,043,160 | 7/1962 | Killian | 74/509 |
| 3,176,805 | 4/1965 | Gandy | 64/7 X |
| 3,678,706 | 7/1972 | Shirley et al. | 64/7 |

Primary Examiner—Leonard H. Gerin
Attorney, Agent, or Firm—Browning, Bushman & Zamecki

[57] ABSTRACT

The present invention pertains to an actuator having a unique universal-type joint assembly incorporated therein. The actuator comprises a stationary member and a movable member mounted for movement with respect to the stationary member. The actuator further comprises a first drive means, such as a drive screw, and linkage means connects the first drive means to the stationary member and provides universal-type movement. The linkage means includes a substantially nontorque-absorbing thrust transmitting element. A second drive means, such as a drive nut, is threadedly connected to the drive screw for reciprocation therealong and is also connected to the movable member of the actuator.

22 Claims, 5 Drawing Figures

FIG.1
FIG.2
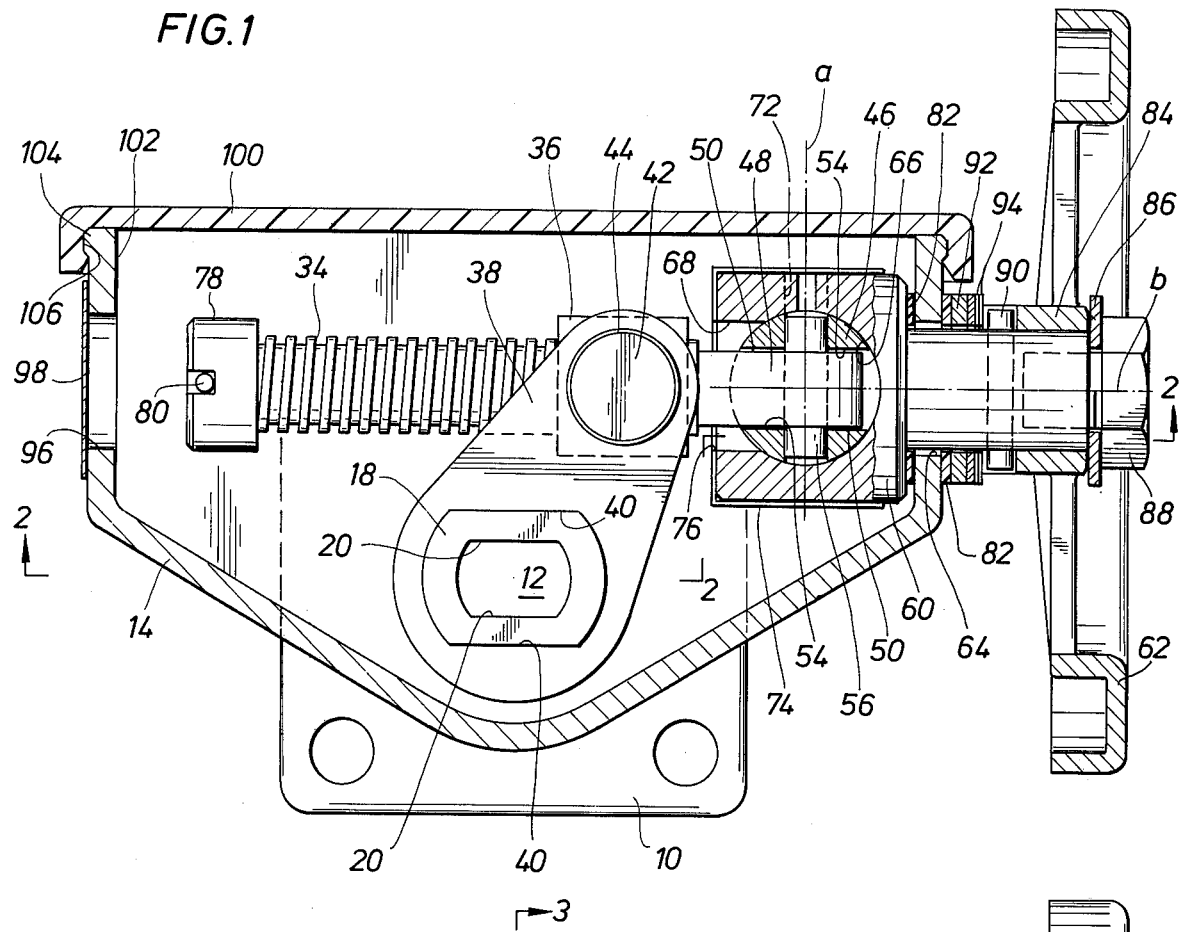
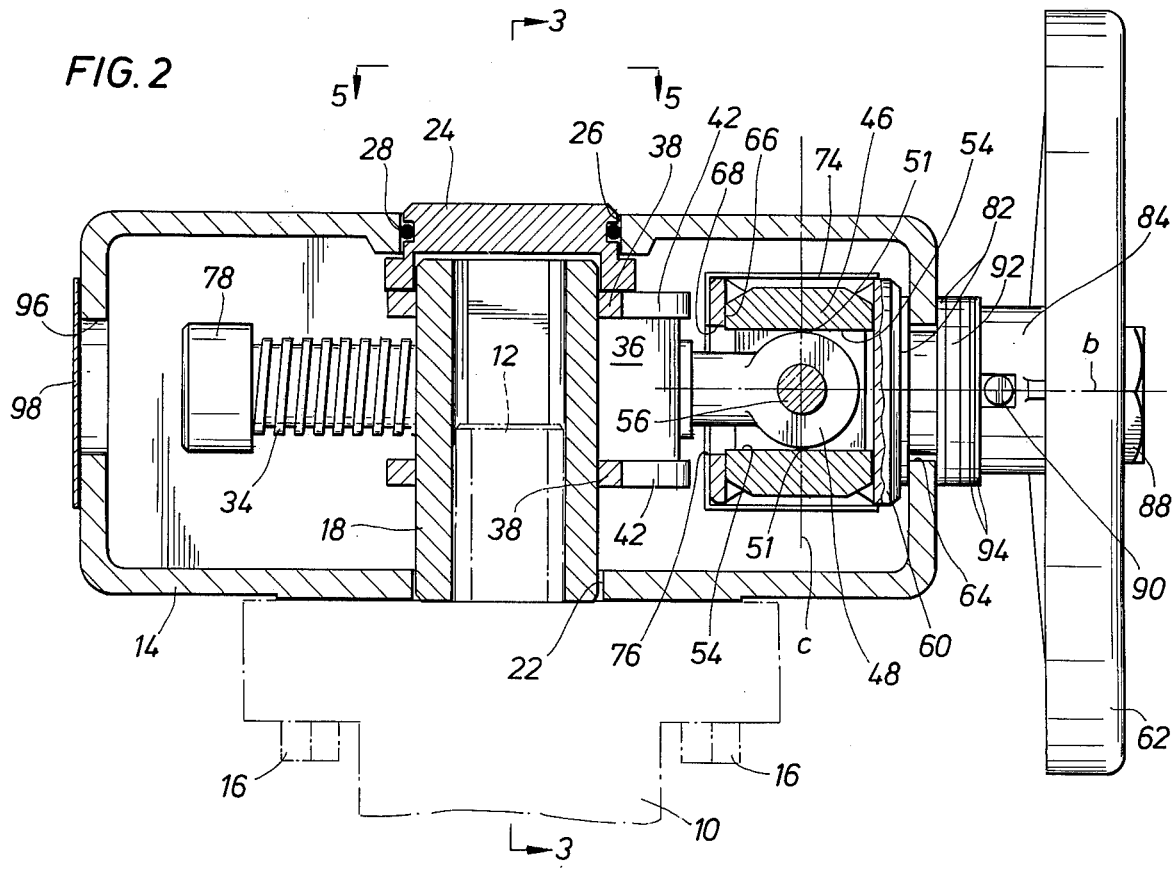

ACTUATOR HAVING UNIVERSAL-TYPE JOINT ASSEMBLY

BACKGROUND OF THE INVENTION

1. Field of the Invention

The present invention pertains to a novel universal-type joint assembly and to an actuator employing such a joint asembly. In particular, the invention finds application in actuators having two threadedly connected and relatively reciprocating drive means such as a drive screw and a reciprocating drive nut. The reciprocatng one of the drive means, usually the nut, is connected to a movable member of the actuator, such as a rotatable shaft or a reciprocable body, in such a way as to effect the desired type of movement upon reciprocation of the nut. The nut is caused to reciprocate by the applicaton of torque to the screw.

The screw-nut type of actuator has long been recognized as one of the simplest and most economical ways of providing a basic mechanical advantage mechanism. However, putting the concept into practice in a convenient and practical device has been difficult.

2. Description of the Prior Art

One approach to the problem of designing a actuator with a screw and nut drive is to provide a swivelling handle or other input device for rotating the drive screw from the exterior of the housing. This obviously complicates the input mechanism making it expensive and inconvenient to use. It also virtually precludes automatic operation of the device and makes sealing difficult. Clearance and access problems are also caused by the swivelling input approach.

Another approach to the problem is to employ an input handle or the like which simply rotates about a single fixed axis and provide a universal-type joint between the handle and the drive screw. The primary problems with this arrangement result from the fact that the universal joint is subjected not only to the high thrust generated by the drive mechanism but also to torques of relatively high magnitudes. Conventional universal joints of the appropriate size for a given actuator are not designed to take such forces. Thus the use of the actuator must be limited or an oversized universal joint must be used.

SUMMARY OF THE INVENTION

The present invention provides a unique universal-type joint which may be used in actuators of the type described above, but which is also useful in numerous other application, particularly those in which a universal joint must be subjected to relatively high loads. The joint assembly includes one element which transmits the thrust but which does not absorb any substantial amount of the torque. This element is preferably the smallest in the joint assembly and allows the joint assembly as a whole to be made relatively small and yet transmit high loads. Other elements of the joint assembly are designed so that the thrust and torque loads are imposed on separate portions of the elements. This minimizes the load imposed on any given portion of these elements making them less susceptible to damage and allowing the thrust and torque loads to be separately applied in areas where they can best be taken.

An actuator according to the present invention comprises a stationary member, such as a housing, and a movable member, such as a shaft, mounted for movement with respect to the stationary member. The actuator also comprises threadedly connected, relatively reciprocable first and second drive means such as an acme screw and nut. Linkage means connects the first drive means to the stationary member for universal-type movement and thus forms the above-mentioned universal-type joint. The linkage means includes the above-described non-torque-absorbing thrust-transmitting element. The second drive means is connected to the movable member, the latter being moved by the second drive means as it reciprocates with respect to the first.

In a preferred embodiment of the invention, the linkage means comprises a swivel clevis element. The swivel clevis element and the first drive means, preferably the screw, have mating first torque-transmitting surfaces which are disposed generally transverse to the length of the screw. These first torque-transmitting surfaces are separate from the portions of the screw and swivel clevis at which the thrust is applied. The non-torque-absorbing thrust-transmitting element is preferably a pin member connecting the drive screw to the swivel clevis element for relative movement about a first axis generally transverse to the length of the screw. The torque-transmitting surfaces transmit torque between the drive screw and the swivel clevis element independently of the pin member while thrust is applied to the screw and swivel clevis at other surfaces which engage the pin.

A driver element is rotatably mounted in the stationary member or housing for rotation about a second axis. Finally, the swivel clevis element is pivotally mounted on the driver element for movement about a third axis perpendicular to each of the other two. The swivel clevis element and the driver element having mating second torque-transmitting surfaces for transmitting torque therebetween.

It can be appreciated that the above-described mechanism eliminates the need for a swivel-type input handle or the like. The actuator can easily be sealed by a simple annular gasket encircling the driver element. The device also allows for easy access through an opening in the housing distal the mounting area of the driver element. A second opening, opposite the mounting area of the driver component in the housing, may be provided with a removable cover so that the actuator can alternatively be assembled for right or left hand rotation.

As explained above, the pin member of the universal-type joint assembly is subjected substantially only to thrust and not to torque. If the movable member of the actuator is a drive shaft used to rotate a second shaft, the second shaft may be mounted so that it is subjected only to torque and not to thrust.

It is thus a principal object of the present invention to provide an improved actuator of the type having a screw and nut drive.

Another object of the present invention is to provide a screw and nut drive actuator having an improved universal-type joint.

Still another object of the present invention is to provide an improved universal-type joint assembly having a substantially non-torque-absorbing thrust-transmitting element.

Yet another object of the present invention is to provide a universal-type joint assembly in which thrust and torque are respectively applied to separate portions of various elements.

Still a further object of the invention is to provide a screw and nut drive actuator with a non-swivelling input and a relatively small universal-type joint assembly.

Other objects, features, and advantages of the present invention will be made apparent by the following detailed description of preferred embodiments, the drawings, and the claims.

BRIEF DESCRIPTION OF THE DRAWINGS

FIG. 1 is a partial sectional view of a valve actuator transverse to the valve stem axis with parts being shown in elevation.

FIG. 2 is a sectional view taken on lines 2—2 of FIG. 1 with parts shown in elevation.

DESCRIPTION OF THE PREFERRED EMBODIMENT

Figure 3:
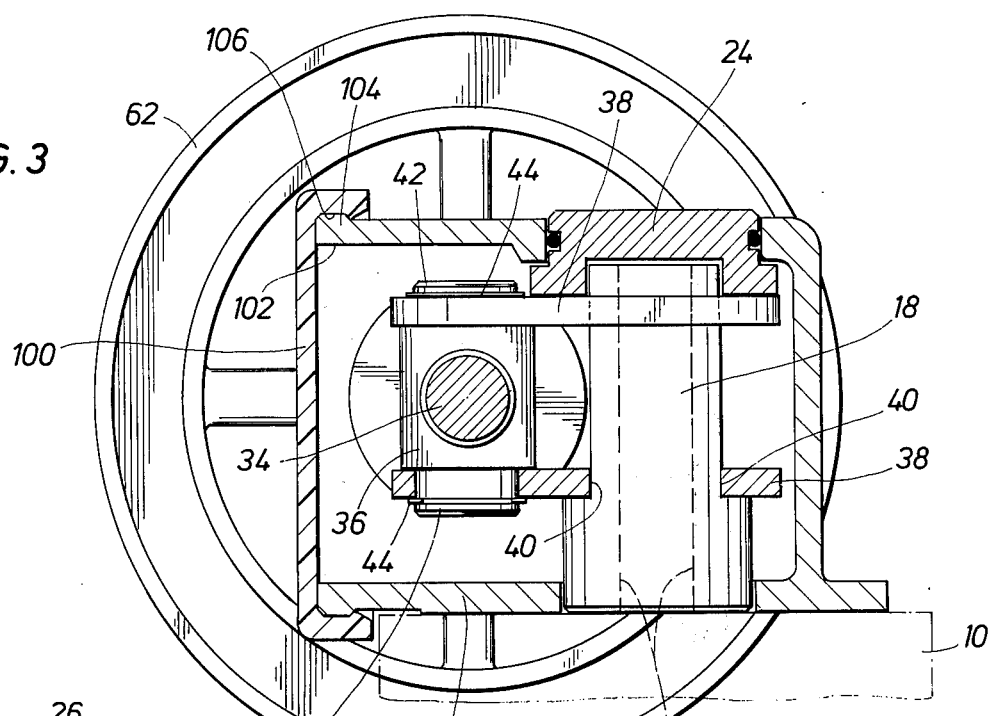
FIG. 3 is a sectional view taken on lines 3—3 of FIG. 2.
Figure 5:
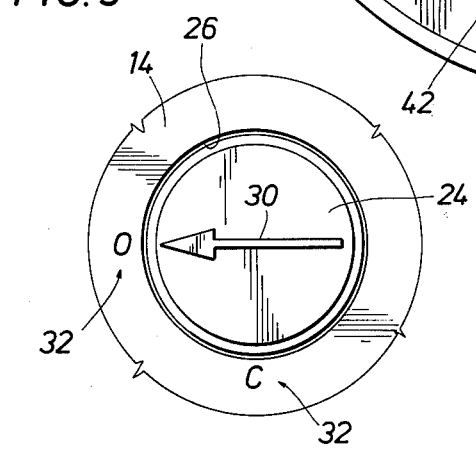
FIG. 5 is a fragmentary plan view taken on lines 5—5 of FIG. 2.

Referring now to the drawings, there is shown a valve actuator and a portion of the associated valve, such as a butterfly valve. The valve has a body 10 and a rotary valve stem or shaft 12 which extends outwardly through the body 10. The actuator comprises a housing 14 which is secured to valve body 10 by bolts 16. A hollow drive shaft 18 is rotatably mounted in the housing 14. Shaft 18 and valve stem 12 are coaxial and the end of stem 12 is received in the shaft 18 and keyed thereto for joint rotation by mating "double D" wrench surfaces as indicated at 20. Shaft 18 is journaled as at 22 in the housing 14. A combination bearing-indicator 24 is journaled in housing 14 as at 26 and keyed by "double D" wrench surfaces to the other end of shaft 18 for joint rotation therewith. Bearing-indicator 24 is sealed against the housing 14 by an O-ring 28. As seen in FIG. 5, the outer surface of bearing-indicator 24 is provided with an arrow 30 which indicates the current position of the valve stem 12 and, accordingly, the attached valve element. The outer surface of the housing 14 adjacent the opening 26 is provided with indicia 32 cooperative with the arrow 30.

Figure 4:
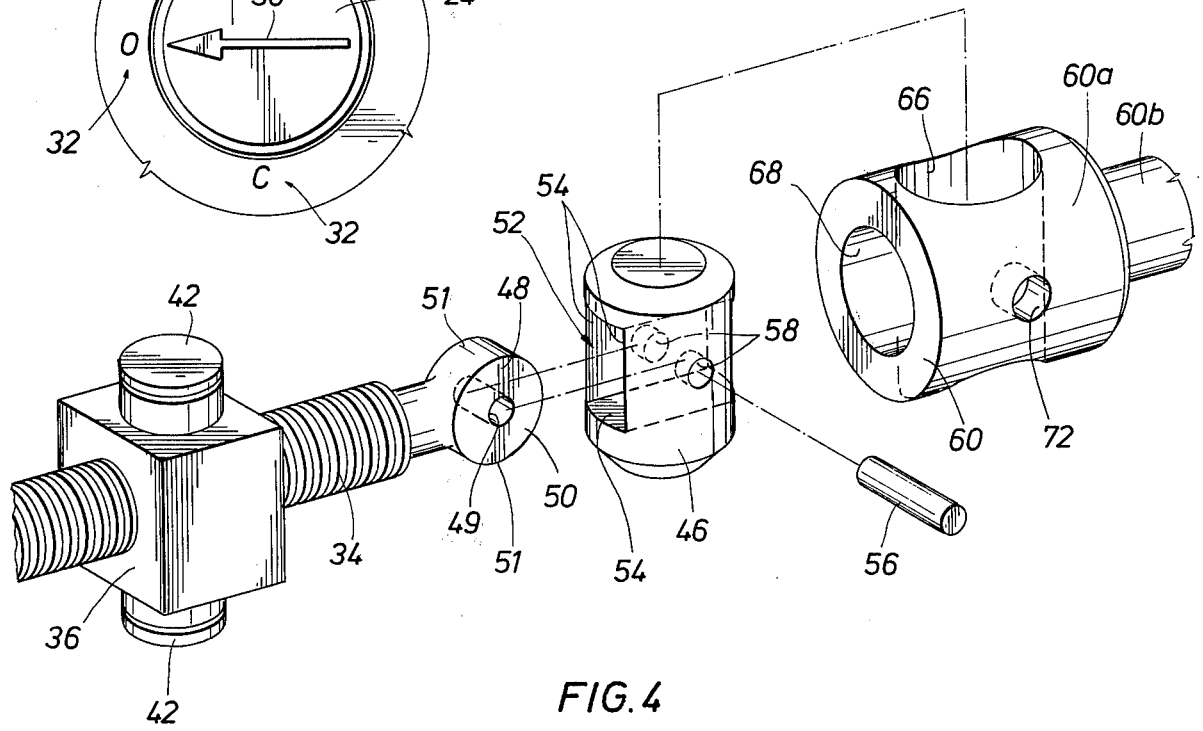
FIG. 4 is an exploded view of the universal joint assembly of the apparatus of FIGS. 1—3.

An acme drive screw 34 is disposed in the housing 14 transverse to the drive shaft 18. Screw 34 is secured in the housing 14 by linkage means to be described more fully below. A drive nut 36 is threadedly connected to the drive screw 34 for reciprocation therealong. A pair of levers 38 connect the drive shaft 18 to the drive nut 36. Each of the levers 38 has one end keyed to shaft 18 by double D wrench surfaces 40. The drive nut has a pair of oppositely directed trunnions 42 (see FIG. 4) affixed thereto, and each of the levers 38 has its other end rotatably mounted on a respective one of the trunnions 42 and secured thereto by a snap ring 44 disposed in an annular circumferential groove in the trunnion.

It can be seen that as screw 34 is rotated, drive nut 36 moves along the drive screw 34 and the attached ends of the levers 38 move with it thus rotating the drive shaft 18 and valve stem 12. The ends of the levers 38 which are attached to the drive nut 36 must swing through an arc as the nut 36 moves longitudinally along the drive screw 34 since their other ends are fixedly attached to the drive shaft 18. Thus the drive screw 34 must be free to pivot about another axis, i.e., it must have swivelling or universal type movement with respect to the housing 14. As used herein, "universal-type movement" will refer to relative movement of two members about two axes which are either truly perpendicular or close enough to perpendicular to allow sufficient freedom for swivelling movement as needed in the particular application. "Universal-type joint" as used herein will refer to a joint which allows such movement and will include joints in which the amount of pivotal movement about one or both axes may be limited to less than 180°.

The linkage means which connects the drive screw 34 to the housing 14 provides a universal-type joint for the drive screw 34. The linkage means comprises a generally cylindrical swivel clevis element 46. One end of the drive screw 34, which will be referred to herein as the torque transmission end, has an eye 48 formed thereon. Eye 48 is of generally cylindrical configuration with its centerline transverse to the length of screw 34. Thus it has a rectangular configuration including flat side surfaces 50 and straight edge surfaces 51 when viewed along the screw centerline. The swivel clevis element 46 has a rectangular radial aperture 52 therein sized to receive the eye 48. The flat side surfaces 54 of the swivel clevis element 46 in aperture 52, with the side and edge surfaces 50 and 51 of the eye 48, form mating first torque-tranmission surfaces which extend generally transverse to the length of the screw 34 and transmit torque between the screw 34 and the swivel clevis element 46. The screw 34 is pivotally connected to the swivel clevis element 46 by a pin 56 which extends through the hole 48 of the eye 48 and aligned holes 58 in the swivel clevis element 46. This connection allows for pivotal movement of the screw 34 about a first axis $a$, generally perpendicular to the length of the screw 34. Axis $a$ comprises one of the axes of the universal-type joint.

The linkage means further comprises a driver element 60 by which torque is imparted from a hand wheel 62 to the swivel clevis element 46 and drive screw 34. Driver element 60 is rotatably mounted in an opening 64 in the housing 14 for rotation about a second axis $b$. The driver element 60 comprises two generally cylindrical portions disposed end-to-end and both coaxial with axis $b$. The smaller portion 60b extends through opening 64 in the housing 14 with the larger portion 60a being disposed in the housing. Driver element 60 has a diametrical cylindrical bore 66 through larger portion 60a sized to receive the swivel clevis element 46. An axial hole 68 extends from the innermost end of the driver element 60 and intersects the bore 66. Bore 66 is centered on a third axis $c$ perpendicular to both axes $a$ and $b$ and forming the other axis of the universal-type joint.

To assemble the universal-type joint, the swivel clevis element 46 is placed in the bore 66. The length of swivel clevis element 46 is sufficient to prevent it from slipping out through hole 68. The eye 48 is then inserted through hole 68 into aperture 52 so that screw 34 extends out through aperture 52. Pin 56 is then inserted through a bore 72 in the driver element 60 into the holes 58 and the opening 48a of eye 48. Bore 72 is vertically offset from holes 58 when the swivel clevis 46 is centered in bore 66. Thus swivel clevis 46 is held in an off center position while pin 56 is inserted. Swivel clevis 46 is then centered in bore 66 moving holes 58 with respect to bore 72 so that pin 56 cannot move out through the latter. A retainer cup 74 having an aperture 76 in its base is then stripped over the screw 34 and driver element 60 so that its sides close the ends of bore 66 and the screw 34 out through aperture 76. Cup 74 retains the swivel clevis element 46 in place centered in bore 66. The retainer cup 74 is firmly secured to the driver element 60 by a friction fit, or by welding, or by any other suitable means. The drive nut 36 may then be threaded onto the screw 34 and a stop nut 78 secured to the free end of the screw 34 by a pin 80.

A pair of annular seal-bearing members 82 surround the small portion 60b of element 60 on opposite sides of the wall of the housing 14. Seal-bearing members 82 are formed of a suitable material, such as woven teflon-fiberglass, which is substantially smooth and rigid but deformable enough to effect sealing.

The hand wheel 62 has an annular, axially projecting hub 84 which receives the outer end of the driver element 60. A Bellville spring washer 86 is disposed at the outer edge of hub 84, and a bolt 88 extends through the washer 86 and into the hub 84 to secure the hand wheel 62 to the driver element 60. Joint rotation of the hand wheel 62 and driver element 60 is achieved by a shear pin 90 extending transversely through hub 84 and driver element 60. The shear pin 90 is the weakest of the torque transmitting elements of the assembly. Thus if the mechanism should jam, the shear pin 90 will break allowing the hand wheel to rotate relative to the driver element 60 so that no damage will be done to the various parts of the mechanism or valve by attempted rotation of the hand wheel.

The hub 84 forms an axially directed shoulder facing toward the housing 14. An annular spacer 92 and a pair of annular wave springs 94 are disposed around the driver element 60 between this shoulder and that bearing-seal member 82 which is located on the outside of housing 14. Spacer 92 allows for component interchangeability between actuators of various sizes, while the springs 94 prevent binding of the driver element 60 against the housing 14.

It can be seen that the hand wheel 62 is rotated about axis $b$, torque will be transmitted through shear pin 90 to the driver element 60. Since the bore 66 and swivel clevis element 46 are disposed transverse to axis $b$, their engaged surfaces serve as mating second torque-transmitting surfaces to transmit torque from the driver element 60 to the swivel clevis element 46. First torque-transmitting surfaces 50, 51 and 54 then transmit torque from the swivel clevis 46 to the screw 34 independently of the pin 56. The pin 56 absorbs substantially no torque; it is subjected only to the thrust generated as the drive screw 34 is rotated and the drive nut 36, with the attached levers and shafts, is moved. Pin 56 serves to transmit this thrust from the screw 34 to the swivel clevis element 46 via the inner surfaces of holes 58 and opening 49 which are separate from the torque-transmitting surfaces 50, 51 and 54. The pin 56, which is the smallest element of the universal joint, can be made quite small. This, together with the provision of separate thrust and torque application surfaces on the screw 34 and swivel clevis 46, allows the joint as a whole to be kept to a reasonable size. The pin 56 is referred to herein as the non-torque-absorbing thrust-transmitting element of the universal-type joint.

Screw 34 can pivot about axis $a$ by virtue of its mounting in aperture 52 by pin 56. The swivel clevis element 46 can rotate in the cylindrical bore 66 about axis $c$ carrying the screw 34 with it. Thus, swivelling or universal-type movement is permitted between screw 34 and driver element 60. Since driver element 60 is fixed with respect to the housing 14, except for rotation about its own axis $b$ — the input axis — the screw 34 may also be said to have universal-type movement with respect to the housing 14. The pivotal movement about both axes $a$ and $c$ is limited by engagement of the screw 34 with the inner surfaces of hole 68. However, hole 68 is wide enough to allow sufficient movement to accomodate the necessary arc of nut 36 and the attached lever ends as the screw 34 is rotated.

Just as the pin 56 is subjected only to thrust, the valve stem 12 is subjected only to torque. This is because bearing 24 and shaft 18 transmit the thrust to the housing 14. All other elements of the universal-type joint and drive means are subjected to both thrust and torque although, as mentioned above, at least some of these elements have separate thrust and torque application surfaces or portions.

An opening 96 is provided in the housing 14 directly opposite and identical to the opening 64 in which the driver element 60 is mounted. Opening 96 is closed by a plate 98 affixed to the outer side of the housing 14 by adhesive. Plate 98 can be removed so that the driver element 60 can be alternatively mounted in opening 96 and the entire drive mechanism reversed. This allows the actuator to be assembled for either left-hand or right-hand rotation.

One entire side of the housing 14 is formed by a cover 100 which can be removed to provide an access opening 102 remote from the mounting site of the driver element 60. The cover 100 is preferably formed of resilient plastic material which can be stretched over and snapped onto the remainder of the housing by mating male and female keys 104, 106.

Numerous modifications of the preferred embodiment described above can be made without departing from the present invention. For example, while the actuator has been shown in connection with a rotary valve, it can be used with numerous other devices both rotary and reciprocating. Various modifications can also be made in the configurations and means of connection of the various parts. It is thus intended that the scope of the invention be limited only by the claims which follow.

I claim:

1. An actuator comprising:
   a stationary member;
   a movable member mounted for movement with respect to said stationary member;
   first drive means;
   linkage means connecting said first drive means to said stationary member for allowing universal-type movement of said first drive means with respect to said stationary member, said linkage means including a substantially non-torque-absorbing thrust-transmitting element; and
   second drive means threadedly connected to said first drive means for relative reciprocation therebetween, said second drive means also being connected to said movable member.

2. The actuator of claim 1 wherein said first drive means comprises a drive screw and said second drive means comprises a drive nut reciprocable therealong.

3. The actuator of claim 2 wherein said linkage means includes at least one element having separate thrust and torque application portions.

4. The actuator of claim 2 wherein said linkage means further comprises a swivel element and said drive screw has a torque transmission end, said thrust-transmitting element comprising a pin member pivotally connecting said torque transmission end and said swivel element for pivotal movement about a first axis generally transverse to the length of said drive screw, and wherein said drive screw and said swivel element have mating first torque-transmitting surfaces disposed generally transverse to the length of said drive screw, for transmission of torque between said drive screw and said swivel element independently of said pin member.

5. The actuator of claim 4 wherein said swivel element has an aperture therein, said torque-transmission end being disposed in said aperture and said first torque-transmitting surfaces being formed on said torque-transmission end and in said aperture.

6. The actuator of claim 5 wherein said linkage means further comprises a driver element mounted on said stationary member for rotation about a second axis wherein said swivel element is mounted on said driver element for pivotal movement about a third axis generally perpendicular to said first and second axes, said swivel element and said driver element having mating second torque-transmitting surfaces for transmission of torque between said swivel element and said driver element.

7. The actuator of claim 6 wherein said driver element has a generally cylindrical bore therethrough on said third axis and a hole on said second axis intersecting said bore, and wherein said swivel element is generally cylindrical and is disposed in said bore with said aperture communicating with said hole and said drive screw extending outwardly through said hole.

8. The actuator of claim 7 wherein said linkage means further comprises retainer means mounted on the exterior of said driver element adjacent said bore and maintaining said swivel element in said bore.

9. The actuator of claim 2 wherein said stationary member comprises a housing.

10. The actuator of claim 9 wherein said linkage means comprises means rotatably mounted in said housing and further including annular seal means encircling said rotatable means adjacent said housing.

11. The actuator of claim 9 wherein said linkage means comprises means rotatably mounted in said housing and further comprising means located externally of said housing for imparting torque to said rotatable means, said torque imparting means being connected to said rotatable means by shear means.

12. The actuator of claim 9 wherein said linkage means comprises means rotatably mounted in said housing and wherein said housing has an access opening distal said rotatable means, and further comprising a removable cover for said opening.

13. The actuator of claim 9 wherein said linkage means further comprises means rotatably mounted in said housing and wherein said housing has an opening opposite said rotatable means and including closure means for said opening.

14. The actuator of claim 9 wherein said movable member is a first rotary shaft disposed generally transverse to said drive screw, and further comprising a lever having a first end connected to said first shaft for joint rotation of said lever and said first shaft and a second end pivotally connected to said drive nut for movement therewith along said drive screw.

15. The actuator of claim 14 wherein said housing has an indicator opening therein, and further comprising indicator means carried by said first shaft and exposed through said indicator opening.

16. The joint assembly of claim 15 wherein said first and second elements have respective thrust application surfaces separate from said first torque-transmitting surfaces.

17. A universal-type joint assembly comprising;
first and second elements; a substantially non-torque-absorbing thrust-transmitting third element pivotally connecting said first and second elements for relative pivotal movement about one axis, said first and second elements having mating first torque-transmitting surfaces for transmitting torque between said first and second elements; a fourth element, said second element being pivotally mounted on said fourth element for rotation about another axis generally perpendicular to said one axis, said second and fourth elements having mating second torque-transmitting surfaces for transmitting torque between said second and fourth elements.

18. The joint assembly of claim 17 wherein said second element has an aperture therein, wherein said first element is an elongate member having a first end disposed in said aperture, wherein said first torque-transmitting surfaces are disposed on said first end of said element and in said aperture and extend generally transverse to said second axis, and wherein said third element is a pin member.

19. The joint assembly of claim 18 wherein said fourth element has a generally cylindrical bore therethrough on said other axis and a hole generally perpendicular to both of said axis and intersecting said bore, and wherein said second element is generally cylindrical and is disposed in said bore with said aperture communicating with said hole and said first element extending outwardly through said hole.

20. The joint assembly of claim 19 further comprising means for maintaining said second element in said bore.

21. The joint assembly of claim 19 wherein said first element is a screw.

22. The joint assembly of claim 21 further comprising a drive nut threadedly connected to said screw and adapted for reciprocation therealong upon rotation of said screw.

* * * * *

UNITED STATES PATENT AND TRADEMARK OFFICE
CERTIFICATE OF CORRECTION

PATENT NO. : 4,023,432
DATED : May 17, 1977
INVENTOR(S) : Henry R. Killian

It is certified that error appears in the above-identified patent and that said Letters Patent are hereby corrected as shown below:

In Column 3, line 52, insert quotation marks around the words "double D".

In Column 4, line 67, delete the word "stripped" and insert therefor --slipped--.

In Column 5, line 38, after the word "that" insert --as--.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*